(12) United States Patent
Buttolph

(10) Patent No.: US 8,904,781 B2
(45) Date of Patent: Dec. 9, 2014

(54) INTERLACED ACTUATION SYSTEM

(75) Inventor: Martin E. Buttolph, Middlebury, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 329 days.

(21) Appl. No.: 13/548,877

(22) Filed: Jul. 13, 2012

(65) Prior Publication Data
US 2014/0013738 A1    Jan. 16, 2014

(51) Int. Cl.
| F01B 29/10 | (2006.01) |
| H01H 37/00 | (2006.01) |
| H01H 61/00 | (2006.01) |
| H01H 85/00 | (2006.01) |
| F03G 7/06  | (2006.01) |
| H01H 37/32 | (2006.01) |
| H01H 37/56 | (2006.01) |
| H01H 61/02 | (2006.01) |

(52) U.S. Cl.
CPC ............. *F03G 7/065* (2013.01); *H01H 37/323* (2013.01); *H01H 37/56* (2013.01); *H01H 61/02* (2013.01)
USPC ................................ 60/528; 337/1; 337/401

(58) Field of Classification Search
CPC ..... H01H 37/323; H01H 37/52; H01H 37/56; H01H 61/02; H01H 61/0107; F03G 7/065
USPC ................ 60/527–529; 74/2; 337/1, 140, 401
See application file for complete search history.

(56) References Cited

U.S. PATENT DOCUMENTS

| 3,924,688 | A | * | 12/1975 | Cooper et al. .................. 169/61 |
| 5,471,888 | A | * | 12/1995 | McCormick ....................... 74/2 |
| 5,606,889 | A | * | 3/1997  | Bielinski et al. ..................... 74/2 |
| 6,133,818 | A | * | 10/2000 | Hsieh et al. .................... 337/401 |
| 6,525,920 | B2| * | 2/2003  | Rudoy et al. .................. 361/160 |
| 6,747,541 | B1|   | 6/2004  | Holt et al. |
| 2010/0270302 | A1 | | 10/2010 | Sundholm |
| 2011/0030178 | A1 | | 2/2011  | Valembois |

FOREIGN PATENT DOCUMENTS

| JP | H02286500 A | 11/1990 |
| JP | H07187094 A | 7/1995  |

OTHER PUBLICATIONS

Japanese Office Action for Application No. 2013-145072. Mailed Jun. 3, 2014. 6 pages with translation.
Courtney, C., et al., "Electro-Mechanical Mechanisms for Remote Actuation Requirements," Proc. Sixth European Space Mechanisms & Tribology Symposium, Technopark, Zurich, Switzerland, Oct. 4-6, 1995, (ESA SP-374, Aug. 1995).

* cited by examiner

*Primary Examiner* — Christopher Jetton
(74) *Attorney, Agent, or Firm* — Cantor Colburn LLP

(57) ABSTRACT

An actuation system having a configuration of first and second components, each component having longitudinally extending fingers interlaced with one another. Relative longitudinal movement is permitted between the fingers in a manner to permit the second component to be movable longitudinally with respect to the first component between a first position and a second position. A biasing member is provided within the configuration that biases the second component towards the second position. A wire is wound about the fingers that restrains the second component in the first position. A release device selectively causes the wire to be loosened about the fingers such that the biasing member moves the second component from the first position to the second position. An actuator connected to the second component moves with the second component from the first position to the second position.

20 Claims, 6 Drawing Sheets

INTERLACED ACTUATION SYSTEM

BACKGROUND

This invention relates generally to a non-pyrotechnically triggered actuator system which may be used to release or unlock an assembly or provide a one-time force or motion generator component such as a pin, plunger, or other device.

Certain applications call for a simple, compact actuation system for providing a force and/or for moving a pin, plunger or other device, without use of explosives or other pyrotechnics or a relatively large electrical input. Use of pyrotechnics can involve added expense and present safety issues, together with increased complexity. Provision of relatively large electrical input, such as may be required for a suitable solenoid, can similarly increase cost and complexity, and may also increase weight and space requirements. Furthermore, solenoids and other devices may not offer unpowered restraint of motion.

Split-spooled wire-restrained devices may provide for actuation of a component in a manner which uses neither pyrotechnics nor an inordinate amount of electrical input. However, such devices may use more space than desired and present other limitations.

Additionally, it may be advantageous to simplify the design of such split-spooled configurations.

SUMMARY

Generally, one embodiment of the present invention may include an interlaced electrically triggered actuation system having a combination of a first component with longitudinally extending first fingers and a second component with longitudinally extending second fingers. The first fingers are longitudinally interlaced with the second fingers, wherein relative longitudinal movement is permitted between the first fingers and the second fingers, such that the second component is movable longitudinally with respect to the first component between a first position and a second position. A biasing member is carried within the combination that biases the second component towards the second position. A wire is wound about the first fingers and the second fingers that selectively restrains the second component in the first position. A release device is provided that selectively causes the wire to be free to loosen about the first fingers and the second fingers, such that the biasing member moves the second component from the first position to the second position. Also, an interfacing, or interconnecting, member is connected to the second component that moves with the second component from the first position to the second position.

In an embodiment of the present invention, the release device may include a shape memory alloy member that connects the restraining wire to the actuation system, the shape memory alloy member being configured to change shape or break upon being subjected to electrical input, thereby releasing the restraining wire from the actuation system and allowing the restraining wire to become loosened about the first and second fingers.

In one embodiment of the present invention, both the first and second fingers have matching grooves on their outer diameter which line up with the other finger's grooves when in the first position to form, in effect, a substantially uninterrupted helical groove, and the wire is wound about the fingers in the helical groove. The motion of the wire radially out of such groove will occur from the wedging action of the sloped walls of the groove, and this motion of wire expansion can be supplemented by any tendency of the wire to return to a relaxed configuration, which generally translates to the wire assuming a larger diameter.

In one embodiment of the present invention, a method of actuation is provided, which includes combining a first component with longitudinally extending first fingers and an actuator with longitudinally extending second fingers such that the first fingers are longitudinally interlaced with the second fingers. The method includes enabling relative longitudinal movement between the first fingers and the second fingers such that the actuator is movable longitudinally with respect to the first component between a first position and an actuation position, and providing a biasing member within the combination that biases the actuator towards the actuation position. The method further includes winding a wire about the first fingers and the second fingers to restrain the actuator in the first position and loosening the wire about the first fingers and the second fingers such that the biasing member moves the actuator from the first position to the actuation position.

In one embodiment of the present invention, a combination of at least two components are restrained from relative movement with respect to one another by a restraining band, or wire, wound thereabout. These components have longitudinally extending ribs or fingers which allow the components to be longitudinally interlaced with one another. Such components, when interlaced together, form, in the aggregate, a generally cylindrical combination, configuration, or structure, effectively having circumferentially extending surfaces. A generally helical recess or groove is also effectively constructed about such circumferential surfaces for receipt of the restraining wire. The groove cross section may have sloped sides opening radially outwardly, to facilitate the wire not being trapped in the groove. Furthermore the wire may be wedged out of the groove by the force of a biasing element or external force, thereby causing relative motion between the first and second finger subsequent to the release of the restraining wire. In one arrangement, each of the components have peripheral surface portions which define segments of the helical groove, such that when the components are interlaced together, the groove segments on each component generally line up in a mating relationship, when in the first position, and such that the circumferentially extending helical groove is substantially continuous through its extent about the circumferential surfaces of the generally cylindrical structure.

Upon the retaining wire being wound in the helical groove, and the retaining wire being fixed at both ends to at least one of the components, the components are prevented from relative radial and longitudinal, or axial, movement with respect to one another due to the hoop stress imparted by the wire to the combined components and also due to the direct shear stress in the wire imparted from the combined components via the interface at each component groove segment, resulting from any relative forces and/or motion between the first and second parts.

The components are configured such that in the absence of a restraining force maintaining the two components in an interlaced relationship, such components may freely move with respect to one another in at least a longitudinal (or axial) direction. This relative longitudinal movement would typically take the form of the fingers or ribs of one component being in a sliding relationship with the respective adjacent fingers or ribs of the other component.

The interlaced arrangement of the components with respect to one another may provide a relatively compact configuration for an actuator. Additionally, the provision of such interlaced finger arrangement permits creation of a relatively open cavity in the generally cylindrical structure formed by the combined components. This cavity permits the inclusion of an internal biasing device, including without limitation, a spring member, such as a coil spring. Such biasing device can be configured such that when the two components are interlaced together, the biasing device tends to force the two components apart from one another in at least a longitudinal direction. Such biasing force is restrained, however, by the restraining wire, when the restraining wire is wound about the helical groove and fixed at its ends in a manner as discussed above.

At least one of the components may be fitted with an actuator, which could include an activating member or interfacing member such as a pin, plunger, etc., such that in the event the restraining wire is released by a release device, the internal biasing device causes relative motion of at least one of the components with respect to the other. When this occurs, the external component to which the actuator is fixed will likewise experience relative motion and may thereby perform an actuator function such as, for example, actuation of a space craft component, missile or projectile component, or a variety of other applications, it being understood, that the present invention is not limited to the aforesaid examples.

Discussion of spool-type initiators or actuators can be found in *Electro-Mechanical Mechanisms for Remote Actuation Requirements*, by C. Courtney, L. McCormick, T. Moran, and R. Stephenson, presented at the Sixth European Space Mechanisms & Tribology Symposium, Technopark, Zurich, Switzerland, 4-6 Oct. 1995 (ESA SP-374, August 1995), the entirety of which is incorporated herein by reference.

BRIEF DESCRIPTION OF THE DRAWINGS

The drawings referenced herein form a part of the specification. Features shown in the drawings are meant as illustrative of some, but not all, embodiments of the invention, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

DESCRIPTION OF THE PREFERRED EMBODIMENT

In the following detailed description of representative embodiments of the invention, reference is made to the accompanying drawings that form a part hereof, and in which are shown by way of illustration specific examples of embodiments in which the invention may be practiced. While these embodiments are described in sufficient detail to enable those skilled in the art to practice the invention, it will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other embodiments may be utilized, and logical, mechanical, electrical, and other changes may be made without departing from the spirit or scope of the present invention.

Accordingly, the following detailed description is not to be taken in a limiting sense, and the scope of the present invention is defined by the appended claims.

Figure 1A:
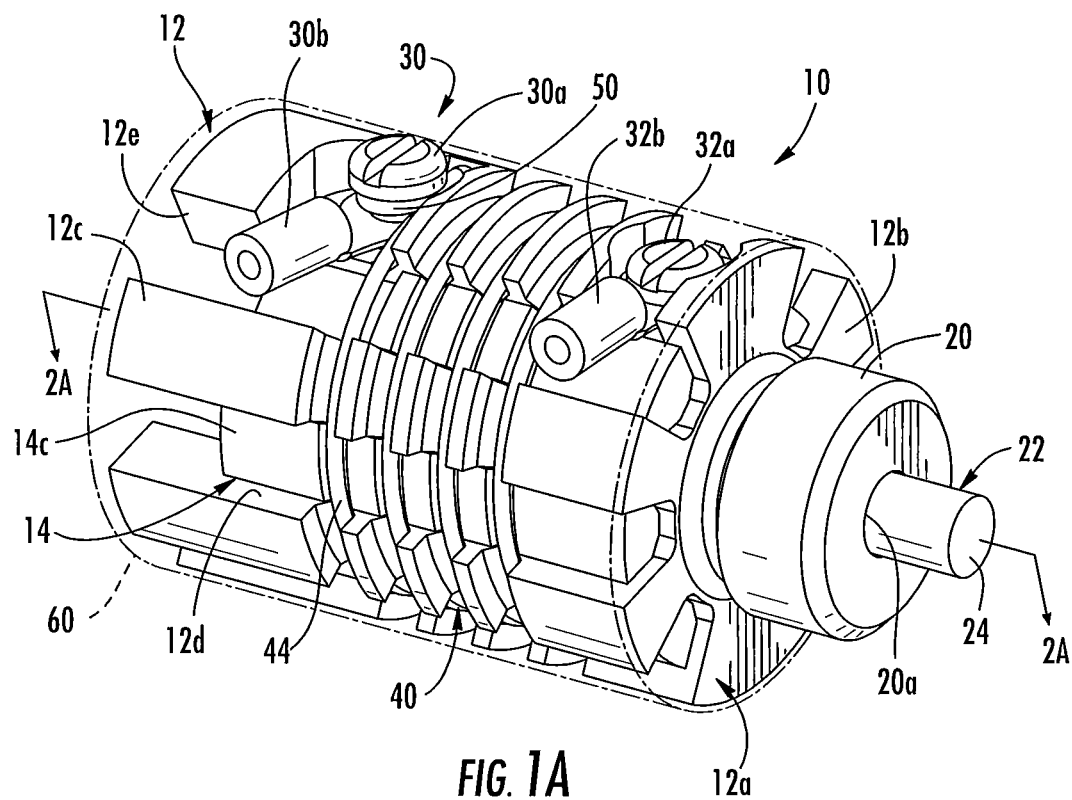
FIG. 1A is a perspective view of an interlaced actuation system constructed in accordance with the present invention, in the first, or, collapsed, position having an actuator in an extended position, poised to pull or retract.
Figure 1B:
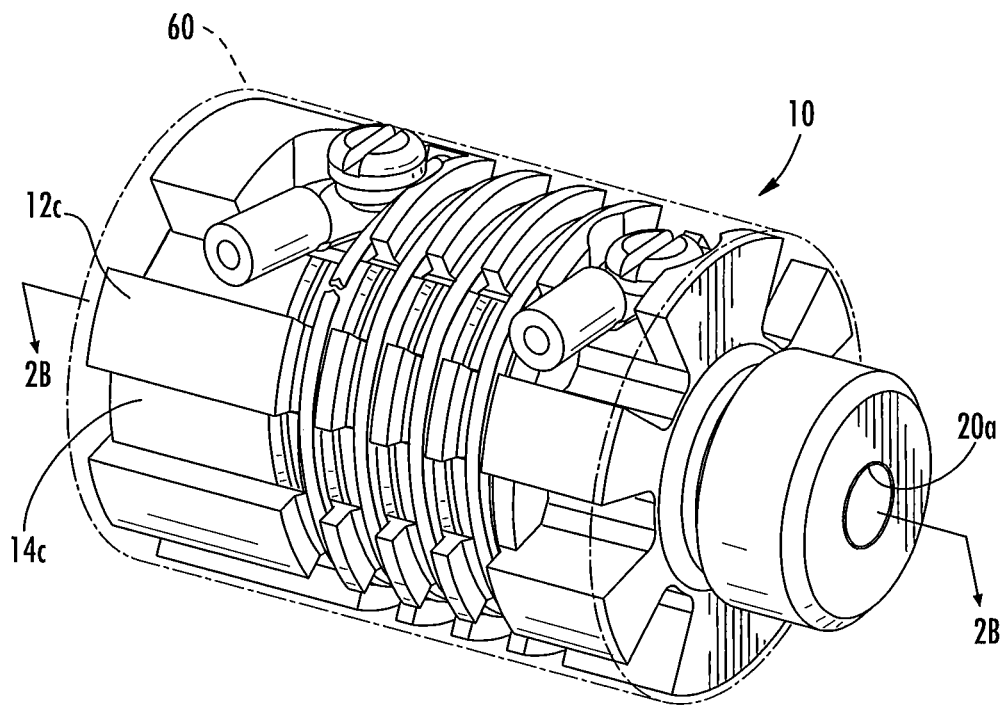
FIG. 1B is a perspective view of the interlaced electro-mechanical actuation system shown in FIG. 1A, with an actuator in a second, or, expanded position resulting in the actuator being retracted.
Figure 1C:
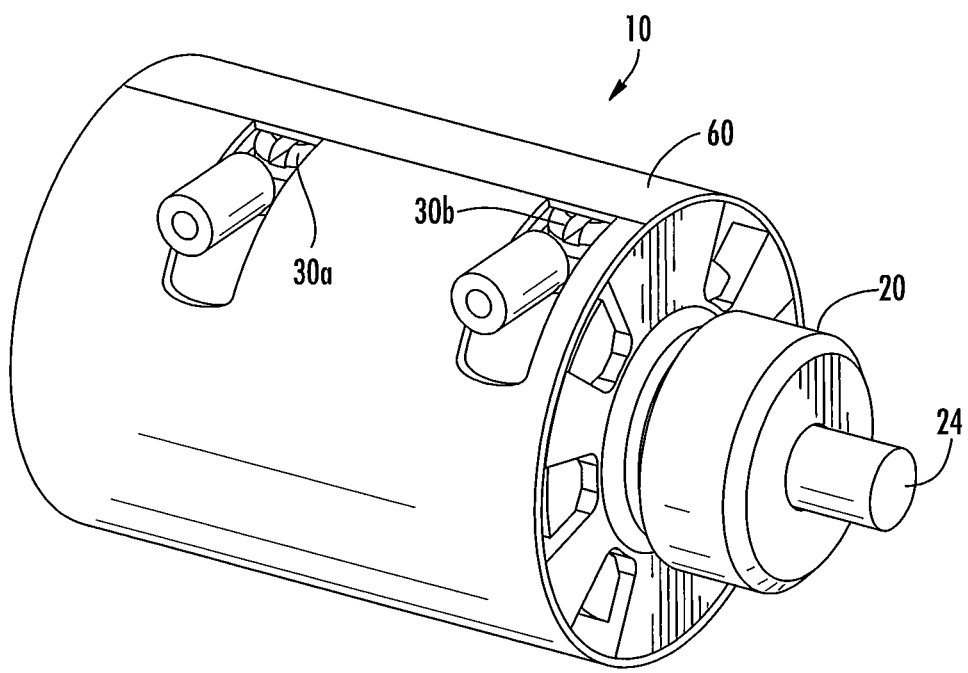
FIG. 1C is a perspective view of the interlaced electro-mechanical actuation system shown in FIG. 1A generally enclosed in a housing.

FIG. 1 illustrates one potential embodiment of an interlaced electro-mechanical actuation system, generally 10, constructed in accordance with the present invention. It is to be understood, however, that the present invention is not limited to the specific configuration shown in the accompanying drawings, but could take on a variety of other configurations and embodiments while still incorporating the inventive aspects of the present invention.

Figure 2A:
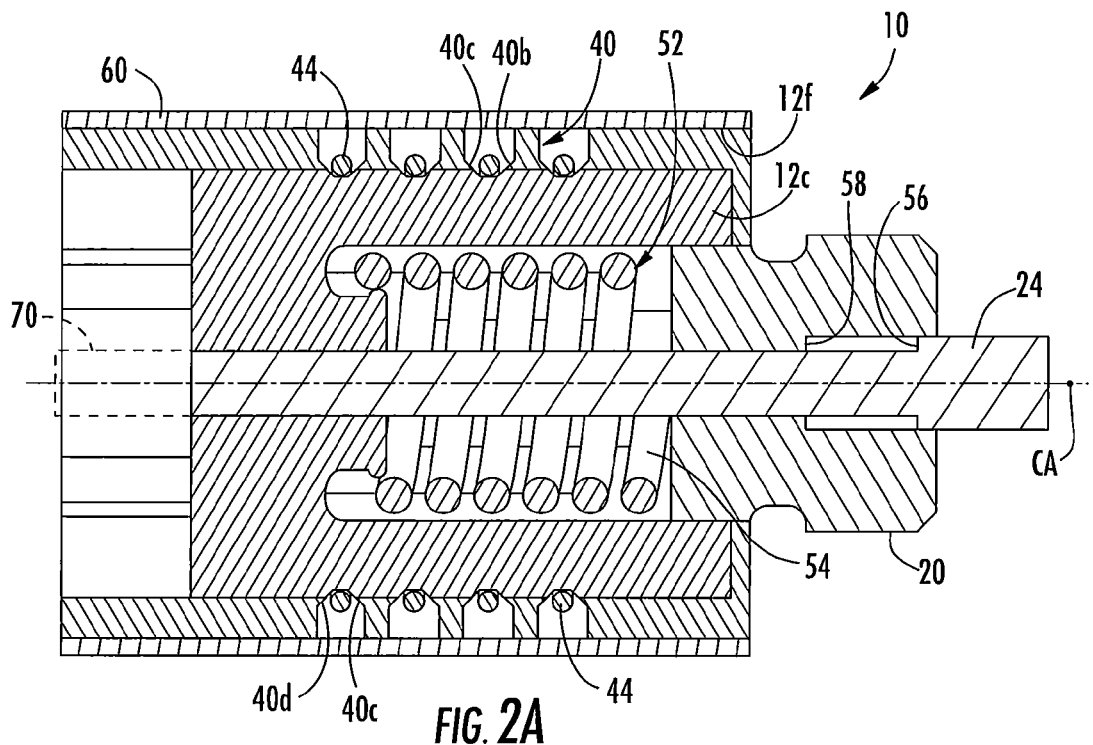
FIG. 2A is a sectional view taken along lines 2A-2A of FIG. 1A.
Figure 2B:
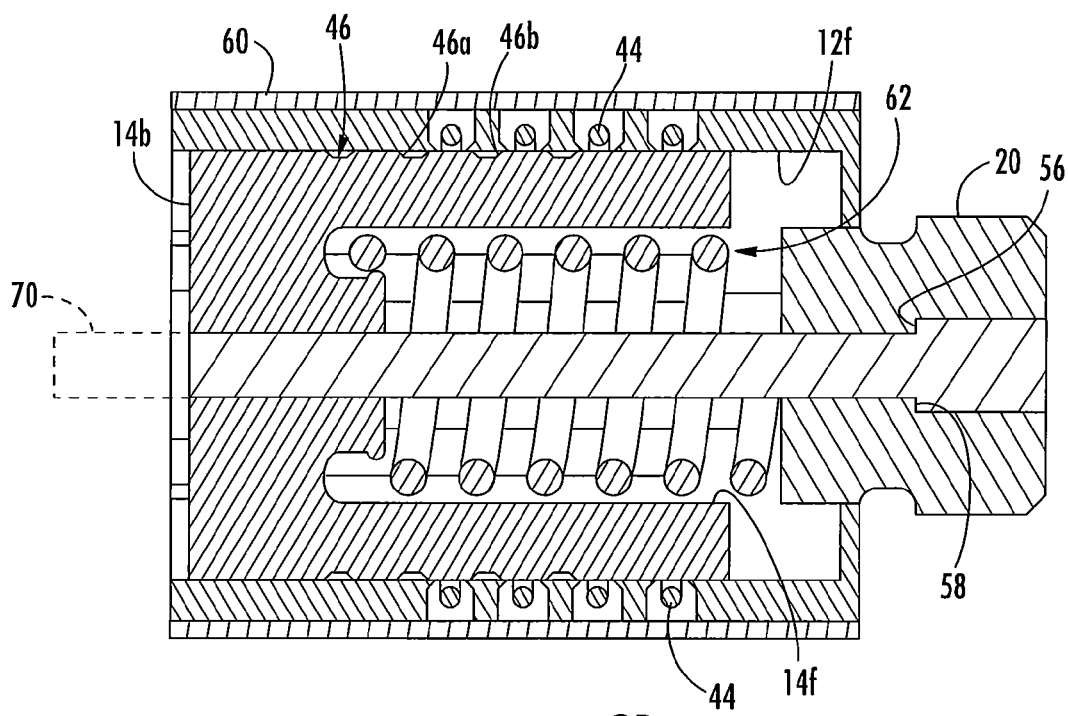
FIG. 2B is a sectional view taken along lines 2B-2B of FIG. 1B.

Interlaced electro-mechanical actuations system, 10, also referred to herein as "system 10," includes a first component, or body portion, generally 12, and a second component, or core portion, generally 14. First component, or interlace member, or element, 12, includes a body, or end portion, generally 12a, which could include a generally planar surface 12b which in effect circumscribes a generally circular disc shape. Extending generally perpendicular from end portion 12a are longitudinally extending ribs, or fingers, 12c, each defining longitudinally extending side surfaces 12d and 12e and a longitudinally extending inner surface 12f (FIGS. 2A and 2B).

Figure 4:
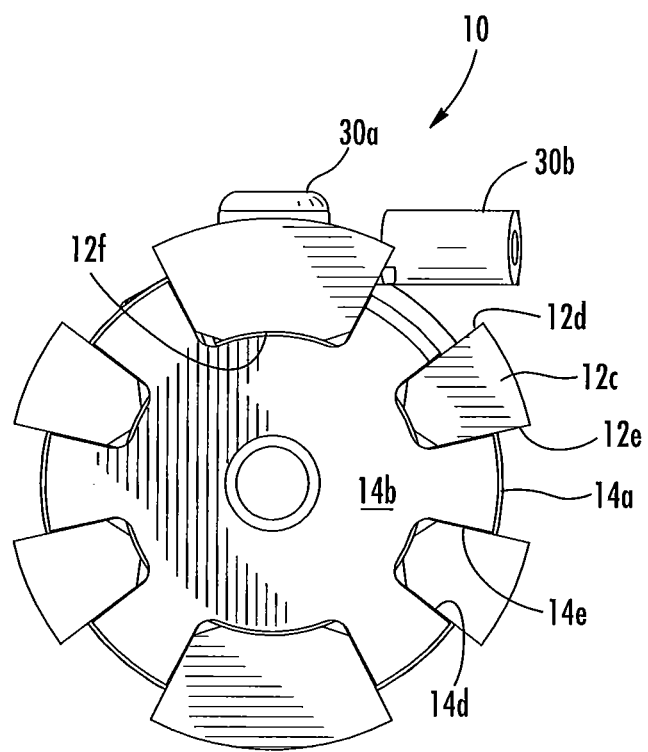
FIG. 4 is a left end view of the interlaced electro-mechanical actuation system shown in FIG. 1A.

As shown in FIG. 4, second component, or interlaced member, element, 14, includes a body, or end portion, generally 14a, which could include a generally planar surface 14b which in effect circumscribes a generally circular disc shape. As shown in FIGS. 1B, 2B, and 4, extending generally perpendicular from end portion 14a are longitudinally extending ribs, or fingers, 14c, each defining longitudinally extending side surfaces 14d and 14e and a longitudinally extending end inner surface 14f.

Interlace element 12 also may include a generally cylindrical collar 20, which could be threaded (not shown) about its periphery for mounting, on one end thereof. Collar 20 defining an opening, or bore, 20a in which an actuator, or interface member, generally 22 (hereinafter referred to as "actuator"), is carried for siding movement. Actuator 22 could include a device, component, or pin 24. It is to be understood that actuator 22 is not limited to the pin configuration shown in the drawings, and that pin 24 is shown for illustrative purposes only. Actuator 22 could take on a variety of different configurations and/or appearances as desired and/or as necessary for a particular application.

Interlaced element 12 also includes two electrical terminals 30, 32 each having a terminal screw, 30a and 32a, respectively, and/or other suitable configurations of securing to restraining wire 44 electrically and/or mechanically to interlaced element 12, and a receiver, 30b, 32b, respectively, for receipt of an electrical input and/or lead (not shown).

Figure 3A:
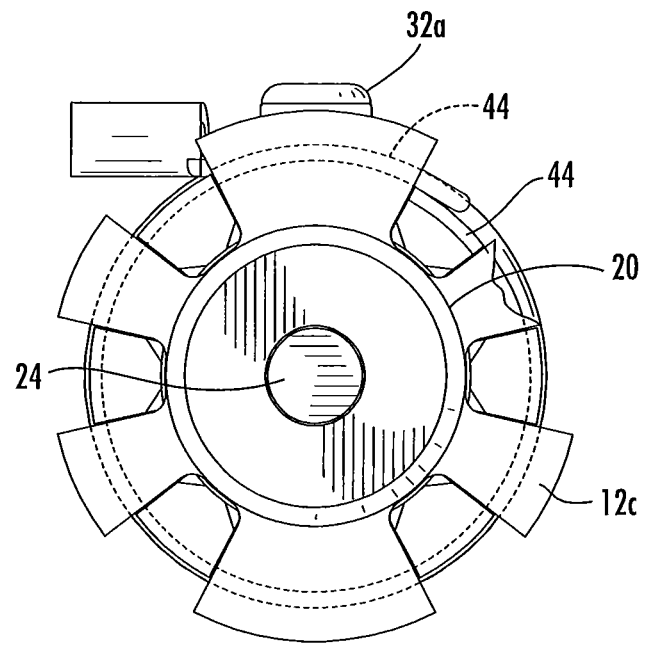
FIG. 3A is a right end view, with parts cut away, of the interlaced electro-mechanical actuation system shown in FIG. 1A.

Interlace element fingers 12c each defines multiple groove segments, generally 40, configured for carrying a restraining strand, or wire, generally 44. As shown in FIGS. 2A and 2B, groove segments 40 include sloped or angled flank or wall portions, generally 40a, 40b, adjacent to generally taller wall portions 40c, 40d, on interlace element 12 on either side of wire 44. Similarly, interlace element fingers 14c include groove segments 46 which also define sloped or angled flank or wall portions 46a, 46b, as best seen in FIG. 2B. Groove segments 40 of interlace element 12 and groove segments 46 of interlace element 14 are configured such that when interlace elements 12, 14 are in an interlaced arrangement, as shown in FIGS. 1A, 2A, and 3A, a generally cylindrical structure is formed by the interlaced elements 12, 14, and groove segments 40, 46, which, in the aggregate, form a generally helically extending groove about the peripheral surfaces of interlaced elements 12, 14 between terminals 30, 32.

FIGS. 1A, 2A, 3A, and 4 each depict restraining wire 44 relatively tightly wound about the radial peripheries of interlaced elements 12, 14 and secured within groove segments 40, 46 such that restraining wire 44 prevents relative movement, and in particular, relative longitudinal movement, between interlaced element 14 with respect to interlaced element 12. In this configuration, shearing forces or stresses are provided by restraining wire 44 at the interfaces of groove segments 40 and groove segments 46 to prevent relative movement of interlace element 14 with respect to interlace element 12 by redirecting what is effectively hoop stress through the beveled groove edges 46a, 46b to generally axially directed restraining forces. Additionally, restraining wire 44 provides such inwardly directed circumferential forces, or hoop stresses, to selectively retain interlace element 14 with respect to interlace element 12.

Actuator 22 may be connected to a linkage, coupling, movable member, and/or device, etc. (none shown). In the event actuation of system 10 is desired, a voltage is applied across the terminals sufficient to melt a fusible link wire 50, which holds restraining wire tightly wound about elements 12, 14. When link wire 50 is subjected to Ohmic heating due to the current generated from the applied voltage, a rise in the temperature of link wire 50 occurs sufficient to melt and break link wire 50, which in turn causes restraining wire 44 (which was connected to link wire 50) to rapidly uncoil and move radially outwardly from groove segments 40, 46, such that interlace element 14 is no longer restrained by restraining wire 44. Link wire 50 may be of smaller gauge than restraining wire 44 in order to facilitate the rapid melting thereof when sufficient voltage is applied across terminals 30, 33 thereby inducing current within link wire 50.

Under the force of biasing device, generally 52, such as a coil spring 54, interlace element 14 is pushed axially with respect to interlace element 12. Since pin 24 is fixedly attached to element 14, rearward movement of interlace element 14 (which is to movement to the left as shown in FIG. 2B) with respect to interlace element 12 causes a retraction of pin 24 with respect to collar 20 and interlace element 12. Rearward advance of actuator pin 24 is optionally limited by the engagement of shoulders 56 of pin 24 against stop surfaces 58 within collar recess 22.

As restraining wire 44 uncoils, after link wire 50 melts, restraining wire 44 is driven by any predisposition within restraining wire 44 to return an uncoiled position, and also by the wedging action of the sloped or angled flanks, or walls 40a, 40b, 46a, and 46b of the groove segments, in which retaining wire 44 is held when in the restraining configuration as shown in FIGS. 1A, 2A, 3A and 4. The taller groove wall portions 46c, 46d on element 12 combined with cover 60 serves to trap restraining wire 44 within grooves 40 of interlace element 12 such that restraining wire 44 does not get tangled, but interlace element 14 is free to move and restraining wire 44 preferably does not make inadvertent contact with a fuse wire terminal 30, 32, thereby potentially causing a short circuit resulting in unintended ohmic heating of restraining wire 44.

Figure 3B:
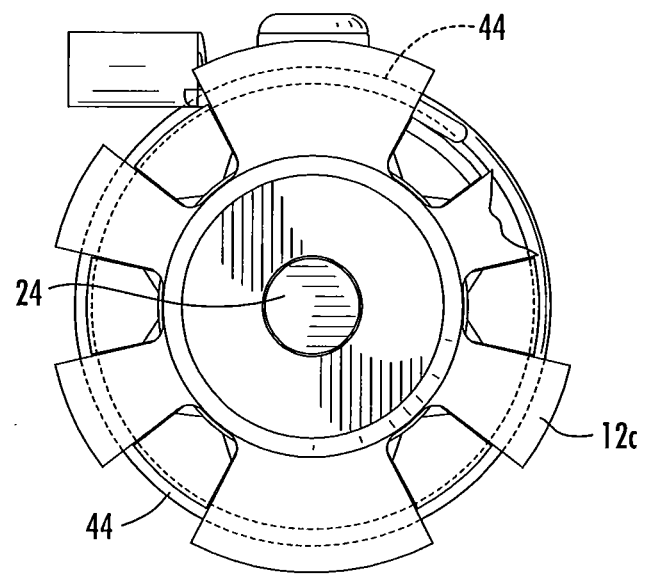
FIG. 3B is a right end view, with parts cut away, of the interlaced electro-mechanical actuation system shown in FIG. 1B.

As shown in FIG. 2B, pin 24 is in a retracted position, by virtue of interlace element 14 having moved to the left with respect to interlace element 12. As can also be seen in FIGS. 2B and 3B, restraining wire 44 has moved radially outwardly with respect to the central axis CA of system 10.

As may be noted from the foregoing, interlaced electromechanical actuation system 10 does not require the radial separation of components 12, 14; rather, such elements experience relative longitudinal movement during the actuation process. Additionally, because system 10 does not require relatively long conical and/or radially overlapping and bulky sloped surfaces that may be found in certain devices, elements 12, 14 of system 10 can, when combined, form a generally cylindrical structure which permits a cavity 62 to be defined therein for receipt of a biasing member 52, such as spring 54. Accordingly, system 10 allows space for an internal biasing element in order to provide actuation of actuator 22, rather than relying on an external force or biasing element or agent, thereby potentially reducing the overall space requirements necessary for performing the actuation purpose.

Although not shown, system 10 could also be used to selectively restrain an exterior force asserted against actuator 22 upon actuator 22 being in an extended position, such that when retaining wire 44 is released, such exterior force is permitted to move actuator 22 to a retracted position.

System 10 could also be configured such that when retaining wire 44 is released, the actuator moves from a retracted position to the extended positioned. This is in effect what happens in the present system 10 (with respect to the left end of system 10) if the left end of pin 24 is considered as being in a relative "retracted" position when the right end of pin 24 is in its extended position with respect to collar 20. In this case, the left end of pin 24 thus moves to a relative "extended" position (again, with respect to the left end of system 10) when the right end of pin 24 moves to its retracted position with respect to collar 20. In an alternate embodiment, the left end of pin 24 could include a portion 70 which could be used to provide a "push" in order to perform another force and/or actuation movement if desired. This "push" provided by portion 70 could be employed instead of or in addition to the "pull" provided by the opposite end of pin 24, and such "push" and "pull" could be employed simultaneously with system 10, if desired. Other variations of system 10 could be made to modify operation of actuator 22, depending on the desire application in which system 10 is to be used.

Figure 5A:
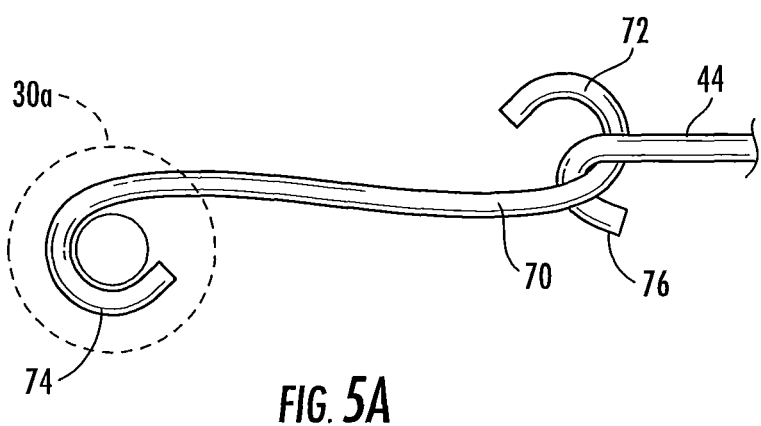
FIG. 5A is a schematic view of a release device, which may include a shape memory alloy member, shown connecting the restraining wire to the actuation system.
Figure 5B:
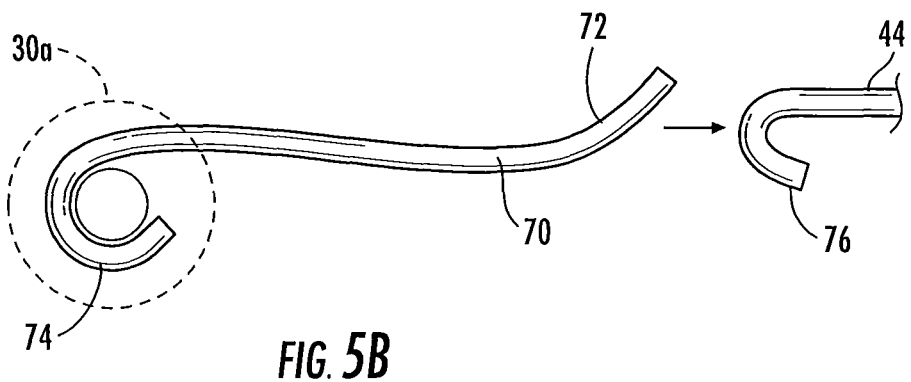
FIG. 5B is a schematic view of the release device shown in FIG. 5A in a release configuration for releasing the restraining wire.

As shown in FIG. 5A, in another embodiment of the present invention, a release device for selectively releasing restraining wire 44 may include a shape memory alloy member, generally 70, that, via a hook portion 72, connects restraining wire 44 to the actuation system 10. Shape memory alloy member 70 may be configured to include an engagement portion 74 for engaging with one of the terminal screws 30a, 30. Member 70 is preferably configured to change shape upon being subjected to an electrical input to the terminal screw engaging engagement portion 74 and ensuing ohmic heating, with hook portion 72 thus becoming straight enough such that a hook portion 76 of restraining wire 44 is released, as shown in FIG. 5B. This, in turn, allows restraining wire 44 to become loosened about the first and second fingers 12c, 14c and the ensuing activation of actuation system 10.

While several embodiments have been described in detail herein, it will be apparent to those skilled in the art that the disclosed embodiments may be modified. Therefore, the foregoing description is to be considered exemplary and is not intended to limit the invention to these embodiments. On the contrary, the invention is intended to cover alternatives, modifications and equivalents, which may be included within the spirit and scope of the invention as defined by the appended claims.

Furthermore, in the detailed description of the present invention, numerous specific details are set forth in order to provide a thorough understanding of the present invention. In other instances, well-known methods, procedures, components, configurations, and circuits have not been described in detail as not to unnecessarily obscure aspects of the present invention. However, it will be recognized by one of ordinary skill in the art that the present invention may be practiced without these specific details.

What is claimed is:

1. An actuation system, comprising:
a combination of a first component with longitudinally extending first fingers and a second component with longitudinally extending second fingers;
said first fingers being longitudinally interlaced with said second fingers and wherein relative longitudinal movement is permitted between said first fingers and said second fingers such that said second component is movable longitudinally with respect to said first component between a first position and a second position;
a biasing member within said combination that biases said second component towards said second position;
a wire wound about said first fingers and said second fingers that selectively restrains said second component in said first position;
a release device that selectively causes said wire to be loosened about said first fingers and said second fingers such that said biasing member moves said second component from said first position to said second position; and
an actuator connected to said second component that moves with said second component from said first position to said second position.

2. The actuation system as defined in claim 1, further comprising:
said first component having a first body portion with said first fingers extending generally perpendicularly from said first body portion; and
said second component having a second body portion with said second fingers extending generally perpendicularly from said second body portion.

3. The actuation system as defined in claim 1, further comprising:
said combination defining a generally cylindrical surface portion; and
said wire being wound about said cylindrical surface portion.

4. The actuation system as defined in claim 1, further comprising:
said combination defining a cavity between said first body portion and said second body portion, adjacent said first fingers and said second fingers; and
said biasing member being carried in said cavity.

5. The actuation system as defined in claim 1, further comprising:
said combination defining a generally cylindrical surface portion;
said cylindrical surface portion defining a plurality of groove segments; and
said wire being wound about said cylindrical surface portion in said groove segments.

6. The actuation system as defined in claim 1, further comprising:
said first fingers and said second fingers together forming a generally cylindrical surface portion;
said first fingers defining a plurality of first groove segments;
said second fingers defining a plurality of second groove segments;
said first groove segments and said second groove segments together forming a generally helical groove arrangement about said cylindrical surface portion; and
said wire being wound about said cylindrical surface portion in said generally helical groove arrangement.

7. The actuation system as defined in claim 1, further comprising:
a housing generally encircling said combination that retains said wire upon said wire being loosened.

8. The actuation system as defined in claim 1, further comprising:
said release device including a fusible link that connects said wire to said combination;
an electrical input connected to said fusible link; and
said fusible link being configured to melt and break upon being subjected to electrical input, thereby releasing said wire from said combination and allowing said wire to become loosened about said first fingers and said second fingers.

9. The actuation system as defined in claim 1, further comprising:
said release device including a shape memory alloy member that connects said wire to said combination;
an electrical input connected to said shape memory alloy member; and
said shape memory alloy member being configured to change shape or break upon being subjected to electrical input, thereby releasing said wire from said combination and allowing said wire to become loosened about said first fingers and said second fingers.

10. The actuation system as defined in claim 1, wherein said actuator is a plunger.

11. The actuation system as defined in claim 1, further comprising:
said first fingers and said second fingers together forming a generally cylindrical surface portion;
said first fingers defining a plurality of first groove segments, each having two sloped wall portions and two generally vertical wall portions;
said second fingers defining a plurality of second groove segments;
said first groove segments and said second groove segments together forming a generally helical groove arrangement about said cylindrical surface portion; and said wire being wound about said cylindrical surface portion in said generally helical groove arrangement.

12. The actuation system as defined in claim 1, further comprising:
said first component having a first body portion with said first fingers extending generally perpendicularly from said first body portion;
said second component having a second body portion with said second fingers extending generally perpendicularly from said second body portion;
said combination defining a generally cylindrical surface portion;
said wire being wound about said cylindrical surface portion;
said combination defining a cavity between said first body portion and said second body portion, adjacent said first fingers and said second fingers; and
said biasing member being carried in said cavity.

13. The actuation system as defined in claim 1, further comprising:
said first component having a first body portion with said first fingers extending generally perpendicularly from said first body portion;
said second component having a second body portion with said second fingers extending generally perpendicularly from said second body portion;
said first fingers and said second fingers together forming a generally cylindrical surface portion;
said first fingers defining a plurality of first groove segments;
said second fingers defining a plurality of second groove segments;
said first groove segments and said second groove segments together forming a generally helical groove arrangement about said cylindrical surface portion; and
said wire being wound about said cylindrical surface portion in said generally helical groove arrangement.

14. The actuation system as defined in claim 1, further comprising:
said combination defining a cavity between said first body portion and said second body portion, adjacent said first fingers and said second fingers;
said biasing member being carried in said cavity;
said combination defining a generally cylindrical surface portion;
said cylindrical surface portion defining a plurality of groove segments; and
said wire being wound about said cylindrical surface portion in said groove segments.

15. The actuation system as defined in claim 1, further comprising:
said combination defining a cavity between said first body portion and said second body portion, adjacent said first fingers and said second fingers;
said biasing member being carried in said cavity;
said release device including a fusible link that connects said wire to said combination;
an electrical input connected to said fusible link; and
said fusible link being configured to melt and break upon being subjected to electrical input, thereby releasing said wire from said combination and allowing said wire to become loosened about said first fingers and said second fingers.

16. The actuation system as defined in claim 1, further comprising:
said first component having a first body portion with said first fingers extending generally perpendicularly from said first body portion;
said second component having a second body portion with said second fingers extending generally perpendicularly from said second body portion;
said release device including a fusible link that connects said wire to said combination;
an electrical input connected to said fusible link; and
said fusible link being configured to melt and break upon being subjected to electrical input, thereby releasing said wire from said combination and allowing said wire to become loosened about said first fingers and said second fingers.

17. The actuation system as defined in claim 1, further comprising:
said first component having a first body portion with said first fingers extending generally perpendicularly from said first body portion;
said second component having a second body portion with said second fingers extending generally perpendicularly from said second body portion; and
said first fingers and said second fingers extending substantially parallel to one another in said combination.

18. The actuation system as defined in claim 1, further comprising:
said first component having a first body portion with said first fingers extending generally perpendicularly from said first body portion;
said combination defining a cavity between said first body portion and said second body portion, adjacent said first fingers and said second fingers;
said biasing member being carried in said cavity;
said first fingers and said second fingers together forming a generally cylindrical surface portion;
said first fingers defining a plurality of first groove segments;
said second fingers defining a plurality of second groove segments;
said first groove segments and said second groove segments together forming a generally helical groove arrangement about said cylindrical surface portion;
said wire being wound about said cylindrical surface portion in said generally helical groove arrangement;
said release device including a fusible link that connects said wire to said combination;
an electrical input connected to said fusible link; and
said fusible link being configured to melt and break upon being subjected to electrical input, thereby releasing said wire from said combination and allowing said wire to become loosened about said first fingers and said second fingers.

19. A method of actuation, comprising:
combining a first component with longitudinally extending first fingers and an actuator with longitudinally extending second fingers such that said first fingers are longitudinally interlaced with said second fingers;
enabling relative longitudinal movement between said first fingers and said second fingers such that said actuator is movable longitudinally with respect to said first component between a first position and an actuation position;
providing a biasing member within said combination that biases said actuator towards said actuation position;
winding a wire about said first fingers and said second fingers to restrain said actuator in said first position; and loosening said wire about said first fingers and said second fingers such that said biasing member moves said actuator from said first position to said actuation position.

20. An actuation system, comprising:
a first component having a first body portion with longitudinally extending first fingers extending generally perpendicularly from said first body portion;
a second component having a second body portion with longitudinally extending second fingers extending generally perpendicularly from said second body portion;
said first component and said second component being selectively combinable to form a configuration defining a generally cylindrical surface portion;
said configuration having said first fingers longitudinally interlaced with said second fingers in such a manner that relative longitudinal movement is permitted between said first fingers and said second fingers and such that said second component is movable longitudinally between a first position and a second position with respect to said first component;
said configuration defining a cavity between said first body portion and said second body portion, adjacent said first fingers and said second fingers;
a biasing member carried in said cavity that biases said second component towards said second position;
a wire wound about said cylindrical surface in contact with said first fingers and said second fingers that selectively restrains said second component in said first position;
a release device that selectively causes said wire to be loosened about said cylindrical surface such that said biasing member moves said second component from said first position to said second position; and
an actuator fixedly connected to said second component that moves with said second component from said first position to said second position.

* * * * *